W. R. JAMISON.
Car Coupling.

No. 67,311                                      Patented July 30, 1867.

Witnesses                      Inventor

United States Patent Office.

W. R. JAMISON, OF TAYLORSTOWN, PENNSYLVANIA.

Letters Patent No. 67,311, dated July 30, 1867.

---

IMPROVED CAR-COUPLING.

---

The Schedule referred to in these Letters Patent and making part of the same.

---

TO ALL WHOM IT MAY CONCERN:

Be it known that I, W. R. JAMISON, of Taylorstown, in the county of Washington, and State of Pennsylvania, have invented a new and improved Car-Coupling; and I do hereby declare that the following is a full, clear, and exact description thereof, which will enable others skilled in the art to make and use the same, reference being had to the accompanying drawings forming part of this specification, in which—

Figure 1:
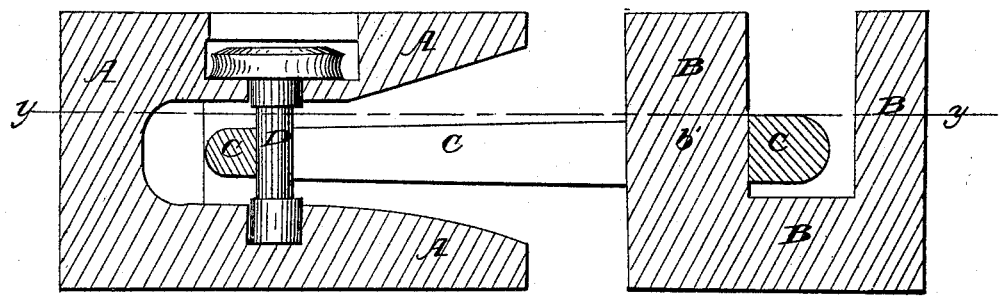
Figure 2:
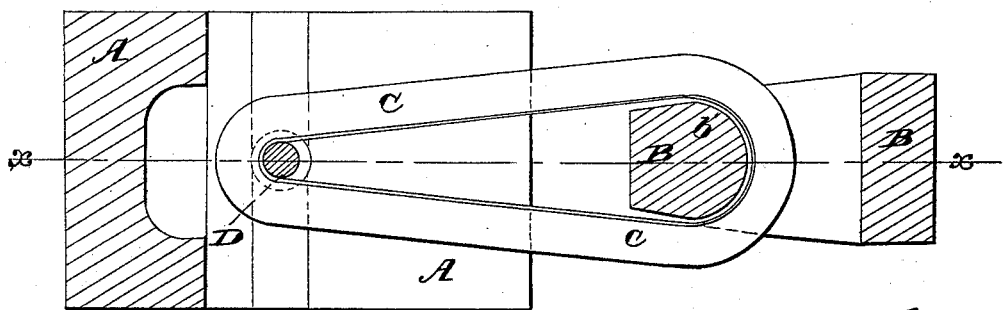

Figure 1 is a vertical longitudinal section of my improved car-coupling, taken through the line $x\,x$, fig. 2.
Figure 2 is a horizontal longitudinal section of the same, taken through the line $y\,y$, fig. 1.
Similar letters of reference indicate like parts.

My invention has for its object to furnish an improved car-coupling, so constructed and arranged that should one or any number of cars be thrown from the track, or fall through a bridge or trestle-work, the cars will immediately uncouple themselves, but will be held securely connected in all other circumstances, even when passing around the shortest curves; and it consists in the construction and combination of the bumper-heads, coupling-link, and coupling-pin with each other, as hereinafter more fully described.

A and B are the bumpers, which are attached to the cars in the same place and in the same manner as ordinary bumpers. The forward end or head of the bumper A is channelled horizontally from side to side so as to form inclined jaws which constitute the mouth of the bumper. In the central part of the bumper A, at the bottom of the said channel, is formed a recess to receive the end of the link C when the bumper-heads come together, allowing the pin to be inserted through a wider part of the link. B is the bumper of the adjacent car, which may be made solid in one piece, or which may be made in two pieces securely bolted to each other. The forward part $b'$ forms the bumper-head, and also acts as a coupling-pin to receive the link, as shown in figs. 1 and 2. C is the link, which is made tapering, as shown in fig. 2, the broader end fitting upon the part $b'$ of the bumper B, and the narrower end entering the mouth of the bumper A, where it is secured in place by the coupling-pin D. The pin D is inserted and removed through a hole in the upper jaw of the bumper A, which hole should be made so large that the hand can be easily inserted through it to adjust or remove the pin when required. The lower end of the pin D enters a horizontal groove in the lower jaw of the bumper A, and its head rests upon the shoulders of a T-shaped groove formed in the upper jaw of said bumper. The pin D is also shouldered, or has the middle part of its body upon which the link C works made smaller, so as to hold it more securely in place. This construction allows the pin D to roll across the bumper A, from one side to the other; as the motion of the cars and their different relative positions may cause the link C to change its place. And the bumper A should be made so broad that the pin cannot pass out of the side of said bumper when the cars are passing around the shortest curves, and need be made no broader. With this coupling, should the engine or one or more cars be thrown from the track, the pin D will pass out at the side of the bumper A, detaching the displaced cars, and preventing them from dragging the rest of the cars with them from the track. Or should a bridge or trestle-work give way under the engine or any of the cars, the bumper B will drop out of the link C and prevent the falling cars from dragging the other cars with them, allowing them to be saved should the brakes be applied so as to stop their motion before they reach the break. But in no possible way can the cars uncouple themselves while the entire train remains upon the track. It should be observed that the bumper A should be attached to one end of each car, and the bumper B to the other end, with the exception of one car in each train, which should have the bumper A attached to both its ends.

I claim as new, and desire to secure by Letters Patent—

The bumpers A and B, coupling-link C, and coupling-pin D, constructed substantially as herein shown and described, in combination with each other, as and for the purpose set forth.

W. R. JAMISON.

Witnesses:
M. O. LANE,
THOS. J. MALOY.